Sept. 26, 1950   H. A. WITTLIFF, JR   2,523,981
RECEPTACLE
Filed July 20, 1945   2 Sheets-Sheet 1
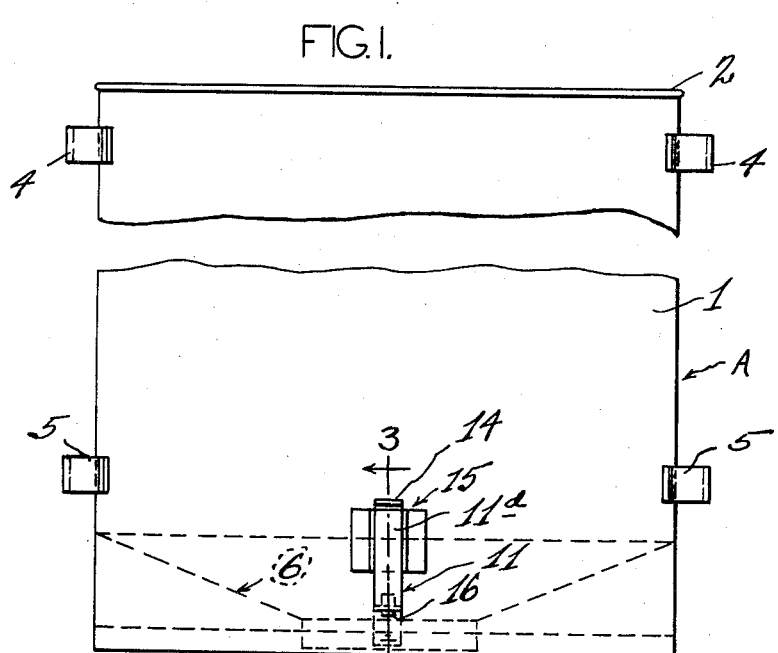
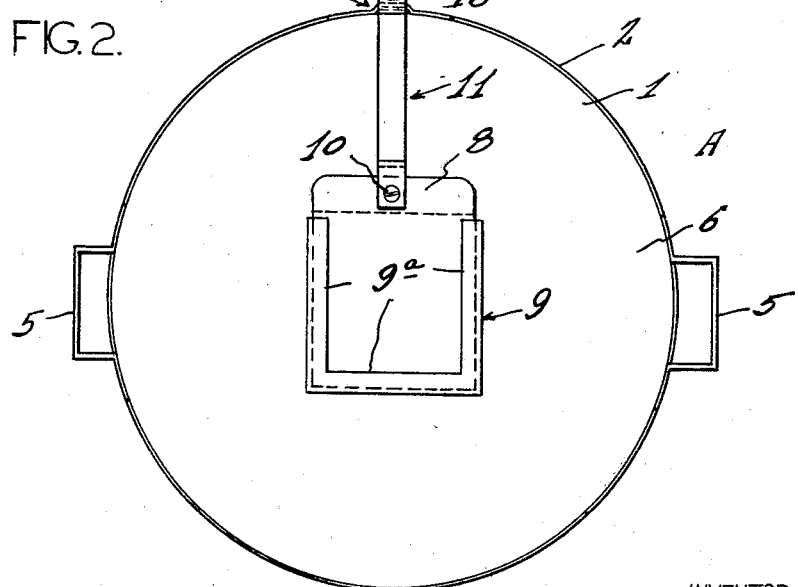
INVENTOR
Herman A. Wittliff, Jr.
BY
E. M. Harrington,
ATTORNEY Sept. 26, 1950 H. A. WITTLIFF, JR 2,523,981
RECEPTACLE
Filed July 20, 1945 2 Sheets-Sheet 2
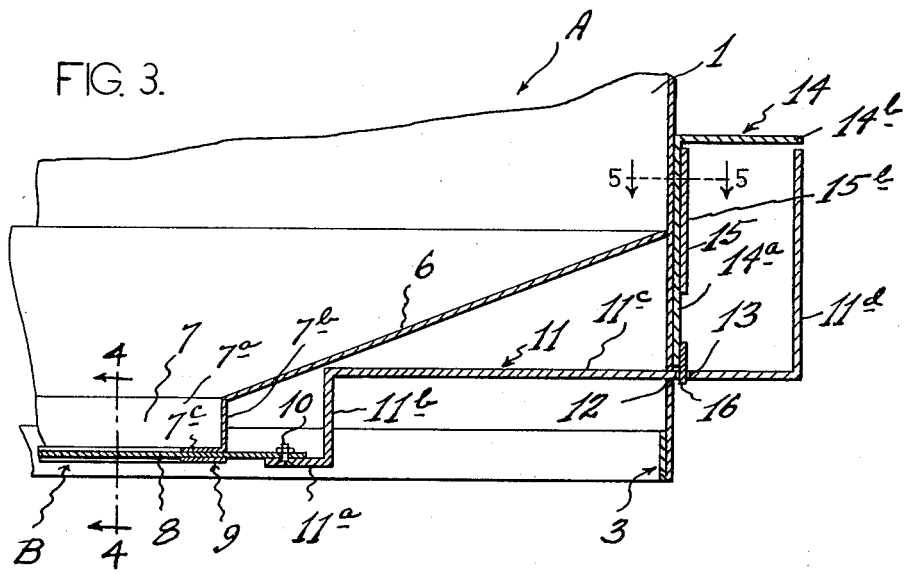
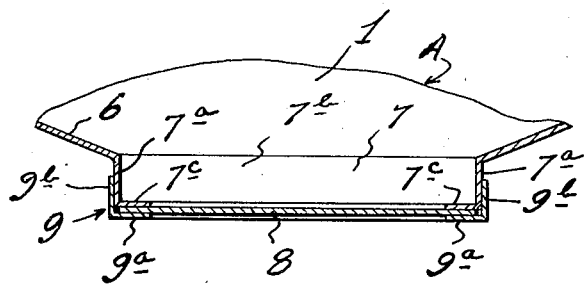
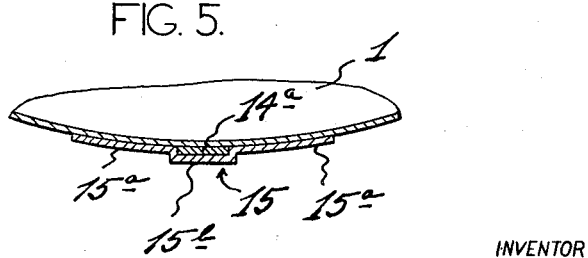
INVENTOR
Herman A. Wittliff, Jr.
BY
E. M. Harrington,
ATTORNEY Patented Sept. 26, 1950

2,523,981

UNITED STATES PATENT OFFICE 2,523,981

RECEPTACLE

Herman A. Wittliff, Jr., San Antonio, Tex., assignor, by mesne assignments, to Robert Wilson Carter, Luling, Tex.

Application July 20, 1945, Serial No. 606,138

1 Claim. (Cl. 220—47)

This invention relates generally to receptacles, and more specifically to receptacles adapted to be transported from place to place in elevated positions by overhead conveyer systems and which are provided with discharge passageways at their bottoms having valves associated therewith for controlling passage through said discharge passageways of matter contained within the receptacles, the predominant object of the invention being to provide such a receptacle which is provided with improved discharge valve means that may be locked in its closed position and which requires only one hand of an operator to unlock said discharge valve means and move same to its open position.

One of the many uses to which the improved receptacle of the present invention may be put is in transporting pecans and other edible nuts to hoppers of machines and other articles of equipment in nut processing plants. In such a plant nuts are introduced into a receptacle through the open top thereof and a receptacle containing nuts, which is suspended from an overhead trackway, or other type of conveyer system, is guided by an operator to positions immediately above the hoppers of articles of equipment for discharge of nuts from the receptacle into the hoppers of articles of equipment. The receptacles are so suspended from the overhead conveyer systems that they are capable of slight swinging movement, and because only one hand of the operator is required to unlock and actuate the valve of the discharge opening of a receptacle to its open position, the operator's other hand may be employed to guide the receptacle and stabilize it in a position immediately above the hoppers of the articles of equipment, so that discharge of nuts directly into said hoppers is assured.

Fig. 1 is a front elevation of the improved receptacle, a part of the receptacle being broken away in order to permit the view to be drawn on a larger scale.

Fig. 2 is an inverted plan view of the receptacle illustrated by Fig. 1.

Fig. 3 is an enlarged, fragmentary, vertical section taken on line 3—3 of Fig. 1.

Fig. 4 is a fragmentary, vertical section taken on line 4—4 of Fig. 3.

Fig. 5 is a fragmentary, horizontal section taken on line 5—5 of Fig. 3.

In the drawings, wherein is shown for the purpose of illustration, merely, one embodiment of the invention, A designates the improved receptacle generally. The receptacle A comprises a cylindrical body portion 1 which is open at the top thereof, the circumferential side wall of said body portion being provided at its top with a bead 2, and said side wall of said body portion at the bottom thereof being preferably turned inwardly and upwardly, as shown at 3 in Fig. 3, to provide the receptacle with a base portion of increased strength. The side wall of the body portion 1 of the receptacle A has welded, or otherwise secured thereto a pair of opposed, upper handles 4, and a pair of similar, opposed lower handles 5, said handles being shaped as is shown to good advantage in Fig. 2. The upper handles 4 are adapted to be engaged by hooks of suspension elements (not shown) which suspend the receptacle from an overhead conveyer system.

The body portion 1 of the receptacle A is provided with a hopper bottom 6, which is shaped as is shown in Fig. 3, and by broken lines in Fig. 1, said hopper bottom 6 comprising an annular wall which inclines inwardly and downwardly from the cylindrical side wall of said body portion 1. At the lower, central portion of the hopper bottom a discharge passageway 7 is provided, said discharge passageway being of rectangular shape and being defined by opposed, vertical side walls 7a, and opposed vertical end walls 7b, only one of said end walls being shown in Fig. 3 but the companion end wall being correspondingly constructed and arranged. The opposed side walls 7a and the opposed end walls 7b which define the discharge passageway 7 are provided with inwardly extended, horizontal flanges 7c which serve a purpose to be hereinafter set forth.

The discharge passageway 7 at the bottom of the receptacle A has associated therewith a valve B which comprises a closure plate 8 which is of such dimensions that it will completely close and block said discharge passageway when it is in its closed position. The closure plate 8 is supported for sliding movement with respect to the lower end of the discharge passageway 7 so that it may be moved from the closed position in which said closure plate is shown in Figs. 2, 3, and 4, to an open position where the discharge passageway is unobstructed by said closure plate. This is accomplished by supporting the plate 8 in interposed, sliding relation between the lower faces of the flanges 7c and the top faces of horizontal flange portions 9a of a guide member 9 which is of substantially U-shaped formation, as is shown in Fig. 2. The guide member 9 includes vertical flange portions 9b which are arranged in overlapping, contacting relation with respect to the opposed side walls 7a and the rear end wall 7b of the discharge passageway 7, said vertical flange portions of said guide member 9 being welded, or otherwise secured, to said opposed side walls and said rear end wall.

As is shown in Figs. 2 and 3, the closure plate 8 of the valve B is substantially longer than the discharge opening 7, and secured to the extended portion of said plate by means of a bolt 10, or otherwise, is a valve operating member 11. The valve operating member 11 includes a portion 11a which underlies the extended portion of the closure plate 8 of the valve B, the bolt 10 securing this portion 11a to said extended portion of said closure plate 8, a vertical portion 11b, a horizontal portion 11c which extends through and is guided by the walls of an opening 12 formed through the circumferential wall of the body portion 1 of the receptacle A, and a vertical portion 11d that provides a hand grip and which extends upwardly from the outer end of the portion 11c. Also, the portion 11c of the valve operating member has formed therethrough a keeper opening 13.

The improved receptacle A includes means for locking the valve B in its closed position where the closure plate 8 completely obstructs the discharge passageway 7, and this locking means comprises an angular element 14 which includes a vertical portion 14a and an upper horizontal portion 14b. The angular element 14 is supported for vertical movement by a metallic strap 15, said metallic strap being provided with opposed wing portions 15a which are suitably secured by welding, or otherwise, to the circumferential wall of the body portion 1 of the receptacle A, and a centrally located portion 15b which partially embraces the portion 14a of the angular element 14 and serves in combination with a portion of the circumferential wall of the body portion of the receptacle, to guide the angular element 14 for vertical movement. The portion 14a of the angular element 14 is provided at its lower end with a locking bolt 16 which is adapted to extend into the keeper opening 13 of the portion 11c of the valve operating means 11, when the valve is in its closed position with respect to the discharge passageway 7, so as to lock said valve in such closed position.

It is to be noted that when the valve B is locked in its closed position with respect to the discharge passageway 7, the space 17 defined by vertical portion 11d and the outer part of the portion 11c of the valve operating member 11, and by the portions 14a and 14b of the angular element 14 (see Fig. 3) is sufficiently large to permit an operator to insert his hand through said space so that he may grasp the vertical portion 11d of the valve operating member 11.

With the vertical portion 11d of said valve operating member 11 so grasped by the operator's hand, and with the discharge passageway 7 positioned immediately above a hopper of an article of equipment, while the receptacle is steadied in position by the operator's other hand, the operator may raise the index finger of the hand which grasps the portion 11d of the valve operating member 11 against the portion 14b of the angular element 14 so as to elevate said angular element. Such elevation of the angular element 14 will cause the locking bolt 16 to be withdrawn from the keeper opening 13 of the portion 11c of the valve operating member 11, whereupon the valve operating member 11 may be pulled outwardly to remove the closure plate 8 from its obstructing position with respect to the discharge passageway 7 and thus permit part or all of the contents of the receptacle to be discharged through said discharge passageway. If part, only, of the contents is to be withdrawn from the receptacle, the valve operating member 11 is pushed inwardly when the desired portion of the contents of the receptacle has passed therefrom to again close the discharge passageway, the locking bolt 16 re-entering the keeper opening 13 to lock the valve B in its closed position until it is desired to again move the valve to its open position, when the above described unlocking operation is repeated.

I claim:

A receptacle comprising a side wall structure, a bottom wall having a discharge passageway formed therethrough, a closure for said discharge passageway which is supported for sliding movement to open and closed positions with respect to said discharge passageway, a slidably supported element for moving said closure to open and closed positions with respect to said discharge passageway, said element being connected to said closure and being provided with a vertically extended hand grip adapted to be gripped by an operator's hand for actuating said element, and locking means for locking said element and said closure in the closed position of said closure with respect to said discharge passageway, said locking means comprising a member supported for vertical movement that includes a part which is adapted to engage said element and said member being provided with a horizontally extended portion that is located adjacent to the hand grip of said closure moving element at the upper end thereof and which may be elevated by the same hand of an operator that grips said hand grip of said closure moving element so as to unlock said closure moving element and said closure for movement of said closure to its open position with respect to said discharge passageway.

HERMAN A. WITTLIFF, Jr.

REFERENCES CITED

The following references are of record in the file of this patent:

UNITED STATES PATENTS

| Number | Name | Date |
|---|---|---|
| 45,388 | Chambers | Dec. 13, 1864 |
| 107,975 | Stedman | Oct. 4, 1870 |
| 217,508 | Buckout | July 15, 1879 |
| 252,759 | Goodyear | Jan. 24, 1882 |
| 569,061 | Robinson | Oct. 6, 1896 |
| 625,596 | Payne | May 23, 1899 |
| 635,836 | Ziegenhorn et al. | Oct. 31, 1899 |
| 1,115,375 | Bachowski et al. | Oct. 27, 1914 |
| 1,867,080 | Kraft | July 12, 1932 |
| 2,340,519 | Dorey | Feb. 1, 1944 |

FOREIGN PATENTS

| Number | Country | Date |
|---|---|---|
| 636,657 | France | Jan. 14, 1928 |